(12) United States Patent
Schmidt et al.

(10) Patent No.: US 7,745,535 B2
(45) Date of Patent: Jun. 29, 2010

(54) AMPHIPHILIC BLOCK COPOLYMERS

(75) Inventors: Scott Schmidt, West Chester, PA (US); Peter Callais, Collegeville, PA (US); Noah Macy, Royersford, PA (US); Michael Mendolia, Philadelphia, PA (US)

(73) Assignee: Arkema Inc., Philadelphia, PA (US)

( * ) Notice: Subject to any disclaimer, the term of this patent is extended or adjusted under 35 U.S.C. 154(b) by 385 days.

(21) Appl. No.: 11/491,342

(22) Filed: Jul. 21, 2006

(65) Prior Publication Data

US 2008/0058475 A1    Mar. 6, 2008

(51) Int. Cl.
*C08L 53/00* (2006.01)
*C08F 297/02* (2006.01)

(52) U.S. Cl. .......................... 525/89; 525/242

(58) Field of Classification Search ................. 525/242, 525/89
See application file for complete search history.

(56) References Cited

U.S. PATENT DOCUMENTS

| | | | |
|---|---|---|---|
| 4,242,474 A * | 12/1980 | Shinohara et al. ........... | 525/404 |
| 5,527,271 A * | 6/1996 | Shah et al. .................... | 602/48 |
| 5,844,039 A * | 12/1998 | Scranton et al. ............. | 524/530 |
| 6,111,025 A | 8/2000 | Visger et al. | |
| 6,255,448 B1 | 7/2001 | Grimaldi et al. | |
| 6,437,040 B2 | 8/2002 | Anthony et al. | |
| 6,506,837 B2 | 1/2003 | Destarac et al. | |
| 6,723,814 B2 | 4/2004 | Meier et al. | |
| 6,767,968 B1 | 7/2004 | Liu et al. | |
| 2002/0040117 A1 | 4/2002 | Guerret et al. | |
| 2003/0162896 A1 | 8/2003 | Destarac et al. | |
| 2005/0129647 A1 | 6/2005 | Giroud et al. | |
| 2006/0013882 A1 | 1/2006 | Kohn et al. | |
| 2006/0052545 A1 | 3/2006 | Guerret et al. | |
| 2007/0078197 A1 | 4/2007 | Samuelsen | |

FOREIGN PATENT DOCUMENTS

WO    WO 00/71501    11/2000
WO    WO 2005/056739    6/2005

OTHER PUBLICATIONS

Gohy et al, "Reversible Metallo-supramolecular block copolymer micelles containing soft core", in Macromol. Rapic Commun. 2002, 23, No. 9, pp. 555-560 RHS para 2 of 'Results & Discussion'.
Matyjaszewski et al, "Controlled/living radical polymerization", Materials Today, Mar. 2005, pp. 26-33; p. 26 LHS para; p. 31 LHS 4th para, p. 27 Fig 1.
Lee, et al, "Platelet adhesion onto segmented polyurethane surfaces modified by PEO-and sulfonated PEO-containing block copolymer additives" by Lee et al, in Journal of Biomedical Materials Research, Dec. 6, 1998, vol. 40, Issue 2, pp. 314 ? 323; abstract.
Nardin et al, "Giant Free-standing ABA Triblock Copolymer membranes", Langmuir, 2000, 16, pp. 7708-7712; p. 7709 LHS para 1 of 'Experimental Section'; p. 7708 LHS para 1.
Alexandridis et al, Solvent-regulated ordering in block copolymers< Current Opinion in Colloid & Interface Science 1999, 4:130-139; p. 133 RHS para 2, p. 137 LHS para 'Conclusion', p. 131 RHS para.
Hennink et al, Novel crosslinking methods to design hydrogels, Advanced Drug Delivery Reviews, 2002, 54, pp. 13-36; p. 24 LHS para 'Crosslinking by stereo complex formation'; p. 24 RHS last para; p. 25 LHS 1st para.
Nardin et al, Amphiphilic block copolymer nanocontainers as bioreactors, Eur. Phys,. J. (2001), E4, pp. 403-410; p. 403 RHS para 2; p. 403 LHS para 2 of 'Introduction'.
Simon et al, "Block copolymer—ceramic hybrid materials from organically modified ceramic precursors", Chem. Mater. 2001, 3, pp. 3464-3486; p. 3473 LHS para 1; p. 3468 RHS para 1; p. 3464 RHS para 1.
U.S. Appl. No. 60/808,407, filed May 25, 2006, Schmidt, S. et al.

\* cited by examiner

*Primary Examiner*—Nathan M Nutter
(74) *Attorney, Agent, or Firm*—Thomas F. Roland

(57) ABSTRACT

The invention relates to an amphiphilic multiblock copolymer capable of forming non-covalent crosslinks. The non-water soluble copolymer, having a hydrophilic middle block and hydrophobic end blocks, has a high water transmission or permeation. The copolymer can be used in applications requiring absorption and/or transmission of fluids, the preferred fluids being water or hydrophilic liquids such as glycerin, glycols, and alcohols. One specific use of the amphiphilic multiblock copolymer is as a hydrogel material.

18 Claims, No Drawings

AMPHIPHILIC BLOCK COPOLYMERS

FIELD OF THE INVENTION

The invention relates to an amphiphilic multiblock copolymer capable of forming non-covalent crosslinks. The non-water soluble copolymer, having a hydrophilic middle block and hydrophobic endblocks, has a high water transmission and/or permeation. The copolymer can be used in applications requiring absorption and transmission of fluids, the preferred fluids being water or hydrophilic liquids such as glycerin, glycols, and alcohols. One specific use of the amphiphilic multiblock copolymer is as a hydrogel material.

BACKGROUND OF THE INVENTION

Amphiphilic block copolymers are well known. The majority of amphiphilic polymers are diblock copolymers that are soluble in water. These diblock polymers are used to thicken aqueous solutions and form viscoelastic gels, such as those described in U.S. Pat. Nos. 6,506,837; 6,437,040, and US Patent application 2003/0162896.

Amphiphilic triblock copolymers known commercially as Pluronics are also well described in the literature. These triblock copolymers can contain hydrophilic endblocks and a hydrophobic midblock or vice versa. The hydrophilic block segment is confined to polyethylene oxide (PEO) homopolymer. The triblocks containing hydrophilic endblocks are soluble in water. The triblocks containing hydrophobic endblocks will be insoluble in water.

Amphiphilic diblock polymers may be formed using stable free radical chemistry, as described in U.S. Pat. No. 6,111,025. These polymers are limited to diblock structures, and furthermore describe the use of TEMPO-based nitroxide derivatives for the synthesis of the corresponding block copolymers. This class of free radical control agent [such as (2',2',6',6'-tetramethyl-1'-piperidyloxy-)methylbenzene mentioned in Macromolecules 1996, 29, pages 5245-5254] control only the polymerizations of styrene and styrenic derivatives and are not suited to the controlled polymerization of acrylics. U.S. Pat. No. 6,767,968 describes the use of living-type or semi-living type free radical polymerization to form copolymers having a random block with both a hydrophobic and hydrophilic monomer units. These block polymers are soluble in water or alcohol.

Arkema patent application US 2006052545 describes a diblock copolymer adhesive formed by a controlled radical polymerization that is capable of absorbing water and providing adhesion under humid conditions. This polymer could be water soluble.

Amphiphilic block polymers for use as additives and thickeners in oil-based compositions are described in WO 05/056739.

Hydrogels are typically polymeric materials, which are capable of absorbing aqueous fluids. Hydrogels are generally hydrophilic polymeric materials that have been chemically crosslinked to remain insoluble in water. Hydrogels are often used in wound care, in hygiene articles, in filtration aids, as flexible cushioning materials, as control-release agents, and for the adsorption of aqueous-based fluids.

There is a need for an amphiphilic polymeric material that has excellent water absorption and permeation and is formed without covalent crosslinks. The absence of covalent crosslinks inherently provides ease of processing (by solvent casting, spin coating, spray coating, melt processing, melt blending, etc.) not present in the covalently crosslinked systems. One use of these materials would be as a hydrogel.

Furthermore there is a need to be able to control the water absorption/permeability of the composite as well as the physical and mechanical properties, for example, ranging from a tough thermoplastic type material, for applications such as membranes to tacky rubbers for applications such as pressure sensitive adhesives.

Surprisingly it has been found that a class of multiblock copolymers having a general structure of a hydrophilic middle block and hydrophobic outer blocks can be made by a controlled radical polymerization method to form an amphiphilic copolymer with tailored properties. Furthermore, the physical properties, mechanical properties and the water absorption/transmission properties of the amphiphilic triblock copolymer can be tailored by adjusting the levels and types of monomers in each of the block segments, as well as by adjusting the size and ratio of the blocks. Some of the properties that can be optimized include the level of water or other fluids absorbed and transmitted, gel strength, and other physical and mechanical properties (e.g., materials can range from a brittle thermoplastic to a tacky rubber).

SUMMARY OF THE INVENTION

The invention relates to an amphiphilic multiblock copolymer having a hydrophilic middle block; and hydrophobic endblocks, where the multiblock copolymer is water insoluble.

The invention also relates to blends of this amhiphilic multiblock copolymer with other polymers, and its use in forming useful articles, coatings and films.

DETAILED DESCRIPTION OF THE INVENTION

The invention relates to a class of multiblock copolymers having a general structure of a hydrophilic copolymer middle block or blocks and hydrophobic outer blocks. The hydrophobic endblocks will form physical crosslinks to form a water insoluble polymer composite.

By "multiblock" copolymer, as used herein, is meant any controlled architecture polymer having three or more blocks. All endblocks of the copolymer structure will be hydrophobic blocks. Diblock copolymers are specifically excluded. Examples of multiblock copolymers of the present invention include, but are not limited to, triblock polymers, ABABA block polymers where A is a hydrophobic block and B is a hydrophilic block, ABCBA block copolymers where A is a hydrophobic block, star block copolymers, comb polymers, gradient polymers, and other polymers having a blocky structure, which will be known by those skilled in the art; and C represents a block that can be a homopolymer, or random copolymer, can be of a hydrophilic or hydrophobic nature, and is different in composition from blocks A and B. In a preferred embodiment, the multiblock copolymer is an ABA type triblock copolymer. By "copolymer", as used herein, means at least two different types of blocks are present, though each block may contain more than one type of monomer unit.

By "amphiphilic" as used herein means that the center block of the triblock copolymer is water soluble, water dispersible, or generally capable of absorbing and/or transmitting water, while the end blocks are water insoluble. By "dispersible" is meant the copolymer forms a stable uniform suspension (without the addition of further materials such as emulsifiers) when combined with water at 25° C.

By "water insoluble copolymer" as used herein is meant that the polymer block segment is non-soluble or non-dispersible in water. Less than 100 mg/mL of the amphiphilic copolymer will dissolve in water at 25° C., more preferably less than 50 mg/mL, and most preferably less than 20 mg/mL. The "water insoluble copolymer" segment as used herein is also not generally soluble or dispersible in other polar solvents, such as $C_{1-3}$ alcohols. On the other hand, an amphiphilic di-block copolymer would be soluble or dispersible in water and not of the present invention.

The midblock of the triblock copolymer has an affinity for water or is deemed as a hydrophilic polymer. By "hydrophilic" or "hydrophilic polymer" as used herein is meant the polymer block segment is water soluble, water dispersible, or generally capable of absorbing and/or transmitting water. The hydrophilic middle block could be a hydrophilic homopolymer, a random copolymer containing one or more hydrophilic monomers, or a random copolymer containing one or more hydrophilic monomers with one or more hydrophobic monomers. Ethylenically unsaturated monomers useful in forming the hydrophilic middle block polymer include but are not limited to, acrylic acid, methacrylic acid, and the salts, esters, anhydrides and amides of methacrylic and acrylic acid; dicarboxylic acid anhydrides; carboxyethyl acrylate; hydrophilic derivatives of styrene; and acrylamides. Specific useful monomers include, but are not limited to maleic anhydride, maleic acid, substituted maleic anhydride, mono-ester of maleic anhydride, itaconic anhydride, itaconic acid, substituted itaconic anhydride, monoester of itaconic acid, fumaric acid, fumaric anhydride, fumaric acid, substituted fumaric anhydride, monoester of fumaric acid, crotonic acid and its derivatives, acrylic acid, methacrylic acid, dimethylacrylamide, diethyl acrylamide, n-isopropylacrylamide, dimethylaminoethyl acrylate, diethylaminoethylacrylate, styrene sulfonic acid, acrylamido 2-methyl 2-propane sulfonate, vinylpyrrolidone, 2-carboxyethyl acrylate, methyl acrylate, ethyl acrylate, 2-methoxyethyl acrylate, hydroxyethyl acrylate, hydroxyethyl methacrylate, polyethylene glycol acrylate, polyethylene glycol methacrylate. Salts of the acid monomers and quaternized versions of the amines are also anticipated in the invention. Preferred hydrophilic monomers of the invention include acrylic acid, methacrylic acid, salts of acrylic and methacrylic acid, methoxyethyl acrylate, dimethylacrlyamide, 2-carboxyethyl acrylate, polyethylene glycol acrylate, polyethylene glycol methacrylate, and itaconic acid.

The number average molecular weight of the midblock is in the range of 2 kg/mol to 160 kg/mol, preferably 10 kg/mol to 120 kg/mol, and most preferably 15-100 kg/mol.

The endblocks of the multiblock copolymer are the same and are hydrophobic homopolymers, random copolymers containing one or more hydrophobic monomers, or a random copolymer containing one or more hydrophobic monomers with one or more hydrophilic monomers. By "hydrophobic" and "hydrophobic polymer" as used herein is meant the polymer block segment is non-soluble or dispersible in water. Examples of ethylenically unsaturated monomers useful in forming the hydrophobic end polymer blocks include, but are not limited to, styrene, hydrophobic derivatives of styrene, conjugated dienes, $C_{3-30}$ straight or branched alkyl, and aryl (meth)acrylates, olefins, fluorine-containing monomers, and silicon-containing monomers Specific examples of the hydrophobic monomers include styrene; alpha-methyl styrene, lauryl methacrylate (or other long chain alkyl acrylates or methacrylates, e.g., $C_6$-$C_{30}$ alkyl esters 2-ethylhexyl acrylate and 2-ethylhexylmethacrylate, octyl acrylate, and octyl methacrylate, decyl acrylate and decyl methacrylate, etc.), 1,1-dihydroperfluoroalkyl acrylates and methacrylates of the general structure, $CF_3(CF_2)_nCH_2OCOC(R)=CH_2$, in which R is hydrogen or methyl and n is typically 2 to 20, hexafluorobutyl acrylate, triisopropylsilyl acrylate, isobornyl acrylate, isobornyl methacrylate, butadiene, isoprene, methylmethacrylate, t-butyl acrylate and t-butyl methacrylate. Preferred monomers include, styrene, isobornyl acrylate, isobornyl methacrylate, a mixture of 1,1-dihydroperfluoroalkyl acrylates and methacrylates of the general structure, $CF_3(CF_2)_nCH_2OCOC(R)=CH_2$, in which R is hydrogen or methyl and n is typically 6 to 18, t-butyl acrylate, t-butyl methacrylate and methyl methacrylate.

The number average molecular weight of each end blocks is in the range of 0.5 kg/mol to 80 kg/mol, preferably 3 kg/mol to 60 kg/mol.

Examples of amphiphilic triblock copolymers useful in the invention would include, but not limited to, PS-P(AA/BA)-PS, PS-P(AA/MEA)-PS, PS-P(MAA/BA)-PS, PS-P(BA/CEA)-PS, PS-PDMA-PS, PS-P(DMA/AA)-PS, P(tBA)-P(AA/MEA)-P(tBA), PLMA-P(AA/MEA)-PLMA, PBHA-P(AA/MEA)-PBHA, PMMA-P(AA/BA)-PMMA, etc. where PS is polystyrene, AA is acrylic acid, MAA is methacrylic acid, BA is butyl acrylate, MEA is methoxyethyl acrylate, tBA is t-butyl acrylate, PLMA is polylauryl methacrylate, PBHA is polybehenyl acrylate, CEA=carboxyethyl acrylate, and DMA is dimethylacrylamide. The triblock copolymers of the present invention are formed by a controlled radical polymerization process. These processes generally combine a typical free-radical initiator with a compound to control the polymerization process and produce polymers of a specific composition, and having a controlled molecular weight and narrow molecular weight range. These free-radical initiators used may be those known in the art, including, but not limited to peroxy compounds, peroxides, hydroperoxides and azo compounds which decompose thermally to provide free radicals. In one preferred embodiment the initiator may also contain the control agent.

Block copolymers of the present invention are preferably those formed by controlled radical polymerization (CRP). They differ from random copolymers that may contain some blocks of certain monomers related either to a statistical distribution, or to the differences in reaction rates between the monomers. In these random polymerizations, there is essentially no control over the polymer architecture, molecular weight, or polydispersity and the relative composition of the individual polymer chains is non-uniform When a copolymer segment is synthesized using a CRP technique such as nitroxide-mediated polymerization, it is often termed a gradient or profiled copolymer. This type of copolymer is different than a copolymer obtained by a traditional free radical process. The properties of the copolymer will be dependant on the monomer composition, control agent used, and polymerization conditions. For example, when polymerizing a monomer mix by traditional free radical polymerizations, a statistical copolymer is produced, as the composition of the monomer mix remains static over the lifetime of the growing chain (approximately 1 second). Furthermore, due to the constant production of free radicals throughout the reaction, the composition of the chains will be non-uniform. During a controlled radical polymerization the chains remain active throughout the polymerization step (i.e., the monomer mix is not static over the lifetime of the growing chain), thus the composition of the chains is uniform and is dependant on the corresponding monomer mix with respect to the reaction time. In a preferred embodiment, the hydrophilic copolymer segment of the invention is a profiled copolymer.

It has now been discovered that combining the favorable characteristics of profiled copolymers with the desirable properties of block copolymers leads to materials having advantageous end-use properties by tailoring the monomer composition and sequencing. The use of profiled or gradient block structures allows the final polymer properties to be tuned based on application needs. For example, the properties attained in traditional copolymers are typically an average of the properties imparted by the resultant monomers incorporated, while block copolymers lead to a composite material containing the characteristic properties inherent to each parent polymer block segment. The incorporation of a profiled segment, allows for the tuning of each block segment and sometimes can further simplify the polymer synthesis process. One example is tailoring a segment's glass transition temperature (Tg) e.g., by incorporating a low Tg monomer in a high Tg polymer segment, which allows for an overall reduction of the segment Tg. Another example is reducing the hydrophilicity of a segment by incorporating a hydrophobic comonomer.

In one embodiment of the invention, the triblock copolymer is a thermoplastic elastomer. A thermoplastic elastomer generally consists of an ABA type triblock copolymer in which the A blocks contain high Tg segments or hard blocks and the B block is comprised of a low Tg segment or soft block. The A block Tg usually ranges from 0 to 300° C., preferably from 25 to 200° C. and more preferably from 30 to 150° C. The Tg of the B block is typically from −200 to 130° C., preferably from −100 to 70° C., and more preferably from −80 to 30° C. The main requirement is that the A blocks contain a hard segment and the B block contains a soft segment. ABA triblock thermoplastic elastomers are one particularly useful class of amphiphilic polymers. The profiled copolymer approach lends the ability to tailor the resultant elasticity, Tg, adhesion properties, solubility, etc. by simply varying the comonomer amounts and composition.

Examples of controlled radical polymerization techniques will be evident to those skilled in the art, and include, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). Descriptions and comparisons of these types of polymerizations are described in the ACS Symposium Series 768 entitled *Controlled/Living Radical Polymerization: Progress in ATRP, NMP, and RAFT*, edited by Krzystof Matyjaszewski, American Chemical Society, Washington, D.C., 2000.

In principle, any living or controlled polymerization technique, compatible with the monomer choices, can be utilized to make the block copolymer. One preferred method of controlled radical polymerization is nitroxide-mediated CRP. Nitroxide-mediated CRP is preferred as it allows for the use of a larger variety of monomers in the triblock copolymer, including the use of acrylics and especially acid functional acrylics.

Nitroxide-mediated polymerization can occur in bulk, solvent, and aqueous polymerization media, and can be used in existing equipment at reaction times and temperature similar to other free radical polymerizations. One advantage of nitroxide-mediated CRP is that the nitroxide is generally innocuous and can remain in the reaction mix, while other CRP techniques often require the removal of the control compounds from the final polymer. Furthermore, stringent purification of the reagents is not needed.

The mechanism for this control may be represented diagrammatically as below:

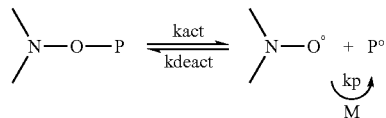

with M representing a polymerizable monomer and P representing the growing polymer chain.

The key to the control is associated with the constants $K_{deact}$, $k_{act}$ and $k_p$ (T. Fukuda and A. Goto, Macromolecules 1999, 32, pages 618 to 623). If the ratio $k_{deact}/k_{act}$ is too high, the polymerization is blocked, whereas when the ratio $k_p/k_{deact}$ is too high or when the ratio $k_{deact}/k_{act}$ is too low though, the polymerization is uncontrolled.

It has been found (P. Tordo et al., Polym. Prep. 1997, 38, pages 729 and 730; and C. J. Hawker et al., Polym. mater. Sci. Eng., 1999, 80, pages 90 and 91) that β-substituted alkoxyamines make it possible to initiate and control efficiently the polymerization of several types of monomers, whereas TEMPO-based alkoxyamines [such as (2',2',6',6'-tetramethyl-1'-piperidyloxy-)methylbenzene mentioned in Macromolecules 1996, 29, pages 5245-5254] control only the polymerizations of styrene and styrenic derivatives. TEMPO and TEMPO-based alkoxyamines are not suited to the controlled polymerization of acrylics.

The nitroxide-mediated CRP process is described in, U.S. Pat. No. 6,255,448, US 2002/0040117 and WO 00/71501, incorporated herein by reference. The above-stated patents describe the nitroxide-mediated polymerization by a variety of processes. Each of these processes can be used to synthesize polymers described in the present invention.

In one process the free radical polymerization or copolymerization is carried-out under the usual conditions for the monomer or monomers under consideration, as known to those skilled in the art, with the difference being that a β-substituted stable free radical is added to the mixture. Depending on the monomer or monomers which it is desired to polymerize, it may be necessary to introduce a traditional free radical initiator into the polymerization mixture as will be evident to those skilled in the art.

Another process describes the polymerization of the monomer or monomers under consideration using a alkoxyamine obtained from β-substituted nitroxides of formula (I) wherein A represents a mono- or polyvalent structure and $R_L$ represents a mole weight of more than 15 and is a monovalent radical, and n>1.

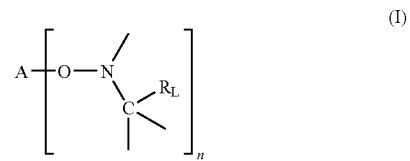

(I)

Another process describes the formation of polyvalent alkoxyamines of formula (I), based on the reaction of multifunctional monomers, such as, but not limited to, acrylate monomers and alkoxyamines at controlled temperatures. The multifunctional alkoxyamines of formula (I), wherein n>2, may then be utilized to synthesize linear, star, and/or branched polymeric and copolymeric materials from the monomer or monomers under consideration.

Another process describes the preparation of multimodal polymers where at least one of the monomers under consideration is subjected to free radical polymerization in the presence of several alkoxyamines comprising the sequence of formula (I), wherein n is a non-zero integer and the alkoxyamines exhibit different values of n. The alkoxyamines and nitroxyls (which nitroxyls may also be prepared by known methods separately from the corresponding alkoxyamine) as described above are well known in the art. Their synthesis is described for example in U.S. Pat. No. 6,255,448 and WO 00/40526.

One useful stable free radical is N-t-butyl-N-[1-diethylphosphono-(2,2,-dimethylpropyl)]nitroxide (DEPN), which has the following structure:

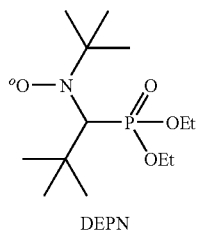

DEPN

The DEPN radical may be linked to an isobutyric acid radical or an ester or amide thereof. A useful initiator is iBA-DEPN initiator, which has the following structure, in which SG1 is the DEPN group.

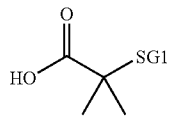

iBA-DEPN initiator when heated separates into two free radicals, one of which initiates polymerization and one of which, the SG1 nitroxide radical, reversibly terminates polymerization. The SG1 nitroxide radical dissociates from methacrylates above about 25° C. and disassociates from acrylates above about 90° C.

Other useful initiators include esters and amides of $CH_3CH(SG1)CO_2H$. If esters or amides are used, they are preferably derived from lower alkyl alcohols or amines, respectively, for example, the methyl ester, $CH_3CH(SG1)CO_2CH_3$. Polyfunctional esters, for example the diester of 1,6-hexanediol $[CH_3CH(SG1)CO_2]_2[(CH_2)_6]$, can also be used. Difunctional initiators can be used to prepare symmetrical A-B-A block copolymers. Initiators with higher functionality, for example the tetraester of pentaerythritol $[CH_3CH(SG1)CO_2CH_2]_4C]$, can be used to prepare star copolymers of the type $I(BA)_n$, in which I is the initiator and n is the functionality of the initiator.

Typically, a monofunctional alkoxyamine is used to prepare an AB block copolymer. A difunctional alkoxyamine can be used to produce a triblock ABA copolymer. However, a triblock copolymer can also be made from a monofunctional alkoxyamine by extending an AB diblock copolymer with an additional A segment (i.e., three sequential reactions of an A segment, then a B segment, then another A segment). Another method for making a triblock copolymer from a monofunctional alkoxyamine is to first react the monofunctional alkoxyamine with a diacrylate (such as butanediol diacrylate) to create a difunctional alkoxyamine. None of the reactions require the addition of further initiation source (such as an organic peroxide), though in some cases, peroxides might be used during the course of the reaction to "chase" residual monomer. If it is preferred to preserve the "living" character of the nitroxide terminated chain ends, the "chasing" step is carried out at a temperature below the nitroxide dissociation temperature as will be evident to those skilled in the art.

The copolymerization may be carried out under conditions well known to those skilled in the art, taking into account the monomers under consideration and the desired product. Thus, the polymerization or copolymerization may be performed, for example, in bulk, in solution, in emulsion or in suspension, at temperatures ranging from 0° C. to 250° C. and preferably ranging from 25° C. to 150° C.

"Sequenced" block copolymers may be produced by 1) polymerizing a monomer or a mixture of monomers in the presence of an alkoxyamine at a temperature ranging from 25° C. to 250° C. and preferably ranging from 25° C. to 150° C.; 2) allowing the temperature to fall and optionally evaporating off the residual monomer(s); 3) introducing a new monomer(s) mixture into the reaction mixture; and 4) raising the temperature to polymerize the new monomer or mixture of monomers. This process may be repeated to form additional blocks. Polymers made by this process will have nitroxide end groups. They can remain on the end of the polymer chains or be removed by an additional processing step.

At any point during the synthesis process a further initiation source (such as an organic peroxide), might be used to create a composite material containing a mixture of controlled block structures and homopolymers. Depending on the monomer(s) present, the non-block structures could be homopolymers or random copolymers. Furthermore, these homopolymers or random copolymers may be primarily hydrophobic or hydrophilic in nature, again dependant upon the monomer(s) present.

The amphiphilic triblock copolymers of the invention generally have a molecular weight (Mw) in the range of from 20 kg/mol to 400 kg/mol.

The Tg of the middle block will typically be lower than that of the outer block, or if the middle block of the parent block copolymer has a higher Tg, upon water absorption the apparent Tg will become lower than the endblocks. In general, the end blocks have a high Tg, most preferably higher than body temperature, and more preferably higher than 50° C. In the case of long chain alkyl(meth)acrylates the Tg is below RT, but the melting temperature is >25° C.

The existence of a block copolymer according to this invention is determined by methods known to those skilled in the art. Example methods to those skilled in the art include, but are not exclusive to, the measured increase of molecular weight upon addition of a second monomer or monomers to chain-extend a living polymer formed from a first monomer or monomer set, observation of microphase separation, including long range order (determined by X-ray diffraction), microscopy and/or birefringence measurements. Other methods of determining the presence of block copolymers include mechanical property measurements, thermal analysis, rheological measurements or elution chromatography techniques.

The amphiphilic block copolymers of the invention contain hydrophobic interactions or physical crosslinks that limit the polymer's water solubility. The insolubility of the triblock copolymer is due to physical interactions, as opposed to covalent crosslinks found in the art. While not being bound by a specific theory, it is known that block copolymers of sufficiently high molecular weight and block segment incompatibility will phase separate on a microscopic scale to form periodically arranged domains which contain predominantly one polymer segment or the other. In samples, which have reached thermodynamic equilibrium, domain sizes of typically from 10-100 nm characteristically take the form of lamellae, cylinders, spheres, and many other more complex morphologies dependant on the polymer structure and composition. The domain sizes and shapes can vary if the sample is trapped in a non-equilibrium state. Based on the amphiphilic nature of the polymers described in this invention, it is presumed the hydrophobic segments form domains, which serve as physical crosslinks preventing dissolution in water. The amphiphilic multiblock copolymer is "water insoluble" as well as in other solvents in which the hydrophobic block is not soluble.

An important feature of the present invention is that the composition and structure of the amphiphilic copolymers can be readily tailored to produce a wide range of physical and mechanical properties, such as water absorption, gel strength, water permeation, adhesion, and such.

The composition of the amphiphilic multiblock copolymer, and the hydrophobic blocks in particular, can be adjusted to effect the solubility/insolubility of the polymer in different solvents, however, in each case the polymer will remain insoluble in water.

The level of water adsorption, or other polar solvent adsorption can be controlled by adjusting the composition and the weight fraction (as compared to the entire block copolymer) of the hydrophilic block. The level of absorption can be controlled to be from 1 to greater than two thousand weight percent, based on the weight of the multiblock copolymer. Depending on the final product application, water or other polar solvent adsorption levels of 5, 50, 500, 5,000, and even 10,000 times the weight of the polymer can be obtained. For example, increasing the weight fraction of the hydrophilic block increases the water absorption. When copolymerizing a hydrophobic monomer with a hydrophilic monomer, increasing the weight percent of the hydrophilic monomer in the amphiphilic segment will increase water absorption (i.e., the water absorption of a 90% hydrophilic/ 10% hydrophobic segment>50% hydrophilic/5% hydrophobic segment>10% hydrophilic/90% hydrophobic segment, provided the hydrophobic and hydrophilic components remain fixed and only the wt % incorporation is altered). The composition of the block copolymer can also be tailored by the addition of ionic groups to change the level of adsorption based on the pH, so as the pH increases, water adsorption will increase. Similarly the composition can be adjusted to provide an optimum level of adsorption of fluids having different pH's. The level of water adsorption at different temperatures can also be controlled by polymer composition, i.e. if N-isopropyl acrylamide is used as the hydrophilic block water absorption will decrease as temperature increases.

In the case of a thermoplastic elastomer, by tailoring the amount of the low Tg segment, materials ranging from tough thermoplastics, for applications such as membranes to tacky rubbers for applications such as pressure sensitive adhesives can be realized.

Because of the properties of the amphiphilic multiblocks, and the ability to tailor the properties widely by adjusting the composition, there are many possible uses of these materials.

Exemplary uses include, but are not limited to the following. One of skill in the art could use these examples and the teaching of this invention to imagine many other uses for the amphiphilic triblock copolymers.

Health care, personal care and cosmetic uses: as a medium for absorbing extudate—such as blood, and urine in articles such as tampons, diapers, sanitary napkins; Ostomy care; Control release media (for drugs, antimicrobials, fragrances, etc . . . ); Bandages; Contact lenses; Artificial tissues; Rheumatic plasters; Ultrasound gel; Cosmetic gelation agent for carrying cosmetically active materials, in a glycerin, glycol, silicon, water, or alcohol-based system. Cosmetic thickeners; Sunscreen; Superabsorbents.

Consumer products: Insoles; Synthetic fibers; Textiles— (gloves, sportswear, moisture regulation in textiles, shoe inserts);

Agro uses: Agricultural media for control of soil moisture or for release of fertilizer; Soil moisture control as a film or soil additive, for retention of meltwater and dew precipitates; Composting additive; Protection of forests against fungal and insect infestation.

Industrial uses: Packaging materials for water-sensitive articles; Food packaging for adsorbing water/blood in fresh meat, fish and poultry; Thickeners for oil/water and water/oil emulsions; Compatibilizers for amphiphilic polymer blends, Chemical process applications (catalyst for organic reactions, immobilization of large functional molecules (enzymes), Surface modifiers; Lubricious coatings; Self-cleaning coatings (architectural coatings); Adhesives; Membranes and membrane coatings (since there is no covalently crosslinked); Removable coatings; Gel electrophoresis which currently uses an acrylamide-based system—providing a material much less toxic than current systems; Shock absorbers; Heat storage media; Filtration aids, Hydrophilic component in polymer laminates; Dispersants; Liquefiers; Building construction, Vibration-inhibiting medium; Tunneling aid in water-rich ground; Cable sheathing; Water treatment; Waste treatment, Water removal (de-icers, reusable sandbags); Cleaning; fire protection of structures and forests; Coextrusion agent in thermoplastic polymers (hydrophilicization of multilayer, Films; Films and thermoplastic moldings capable of absorbing water (for example films for keeping fruit and vegetables fresh by regulating moisture so neither fouling nor wilting occurs.

EXAMPLES

The controlled architecture amphiphilic block copolymers were synthesized using the following generic protocol. Molecular weights were targeted by manipulating the monomer to initiator concentration ([M]/[I]). Therefore a targeted molecular weight could be achieved by setting the [M]/[I] ratio, and then carrying out the polymerization to the desired conversion necessary to reach the target molecular weight. Monomer conversion was conveniently monitored by gas chromatography (GC) analysis or flash devolitization of the unreacted monomer under vacuum. The polymer examples were run neat or in solution. Typical solvents used included, dioxane, n-methylpyrrolidinone, dimethylacetamide, dimethylformamide, tert-butyl alcohol, n-butyl alcohol, toluene, ethyl benzene, methyl acetate, ethyl acetate, propyl acetate, butyl acetate, ethanol, cyclohexanone, cyclopentanone and methyl ethyl ketone. Polymerizations were carried out at ambient pressures or run under nitrogen pressure up to 100 psi. Polymerizations were run in standard polymerization vessels both with and without shearing capacity, although adequate mixing capabilities were preferred.

As a general procedure, a specific amphiphilic triblock copolymer composition is prepared by various traditional monomer addition and polymer isolation protocols, as generically described below and evident to those skilled in the art, dependant on the desired final block composition.

For example, a pure block copolymer is prepared by isolating the pure 1st block by precipitation techniques or by evaporating the residual monomer upon completion of the first block synthesis, followed by the addition of a second monomer composition different from the first. This second monomer composition then undergoes polymerization to make the pure block copolymer.

Profiled block copolymers were synthesized by polymerizing a mixture of two or more monomers. This mixture could result, for instance, by adding a second monomer to the initial polymerization medium prior to evaporation of the residual first monomer, or a multi-monomer mix could be polymerized as a first block, or a multi-monomer mix could be added to an isolated pure first block.

Block copolymer/homopolymer blends were prepared by employing well known chasing techniques. For example, a first block is synthesized by polymerizing a monomer or monomer mix to a desired conversion (less than 100%). The reaction mixture is then cooled to a temperature where the nitroxide is stable at which time a secondary initiation source, such as an organic peroxide, is added to carry out the polymerization of the residual $1^{st}$ block monomers. After the chasing step is complete, the $2^{nd}$ block monomer(s) can be added and the temperature increased to allow for the activation of the nitroxide end groups, which subsequently leads to the formation of a block copolymer. The composite material will then comprise of both the chased homopolymer (similar in nature to the $1^{st}$ block) and a block copolymer. The chasing step can be carried out again with the $2^{nd}$ block or can be used in place of the $1^{st}$ block chase.

The synthesis of the copolymers of the invention as described above are further illustrated by reference to 3 polymerization methods (a, b, and c) and the corresponding specific polymer examples listed below. Other copolymers of this invention can be prepared in an analogous manner, as it will be evident to those skilled in the art.

Example 1

In each of the ensuing examples, the polymers were synthesized starting from a difunctional alkoxyamine initiator. The preparation of the difunctional alkoxyamine initiator used for the majority of the patent examples is now described. 47.0 grams (0.237 moles) of 1,4-butanediol diacrylate was mixed with 355.9 grams of absolute ethanol and bubbled with nitrogen for 10 minutes. The mixture was then added to 190.25 grams (0.499 moles) of iBA-DEPN initiator. The resulting solution was brought to reflux (78-80° C.) while stirring and held at temperature for 4 hours to complete the reaction. NMR shows reaction is >95% of the new dialkoxyamine. Therefore, the solution in ethanol is approximately 38% active. The data for each of the polymerization examples described in the ensuing examples is summarized in Table 1.

TABLE 1

Amphiphilic Block Copolymer Examples.

| Example# | Midblock type | Endblock type | $1^{st}$ block Mn (kg/mol) | $2^{nd}$ block Mn (kg/mol) | Acid in midblock |
|---|---|---|---|---|---|
| 2 | MEA, 5% AA | Styrene | 83 | 19.7 | 4.8% |
| 3 | MEA, 5% AA | t-BA | 83 | 29.5 | 4.8% |
| 4 | MEA, 5% AA | Styrene | 83 | 10.2 | 4.8% |
| 5 | MEA, 50% AA | Styrene | 71.5 | 18.8 | 50.8% |
| 6 | MEA, 50% AA | Styrene | 71.5 | 5.2 | 46.9% |
| 7 | MEA, 50% AA | LMA | 71.5 | 31.8 | 26.9% |
| 8 | MEA, 10% AA | Styrene | 90 | 23.8 | 9.7% |
| 9 | MEA, 10% AA | Styrene | 90 | 14.9 | 9.6% |
| 10 | BA, 25% AA | Styrene | 90 | 41.5 | 24.4% |
| 11 | EA, 25% AA | Styrene | 80 | 33.9 | 24.3% |
| 12 | BA, 10% AA | Styrene | 84 | 19.7 | 9.9% |
| 13 | BA, 10% AA | Styrene | 90 | 15.0 | 12.8% |
| 14 | EA, 10% AA | Styrene | 78 | 16.2 | 12.2% |
| 15 | MEA, 10% AA | Styrene | 80 | 29.5 | 9.1% |
| 16 | BA, 25% MAA | Styrene | 86 | 19.0 | 28.2% |
| 17 | BA, 25% MAA | Styrene | 86 | 59.5 | 27.9% |
| 18 | BA, 25% MAA | LMA | 86 | 46.4 | 28.2% |
| 19 | MEA, 25% MAA | Styrene | 89 | 20.6 | 26.8% |
| 20 | MEA, 15% AA | Styrene | 114 | 32.2 | 12.8% |
| 21 | MEA, 10% AA | Styrene | 100 | 22.0 | 9.8% |
| 22 | BA, 10% AA | Styrene | 78.1 | 26.0 | 6.7% |
| 23 | MEA, 15% AA | Styrene | 76.4 | 26.8 | 14.9% |
| 24 | MEA, 25% AA | Styrene | NM | NM | 23.2% |
| 25 | BA, 25% AA | Styrene | NM | NM | 21.0% |
| 26 | BA, 25% AA | Styrene | 82.6 | 8.2 | 21.7% |
| 27 | MA, 25% AA | Styrene | 82.3 | 13.4 | 22.0 |
| 28 | EA, 20% AA | Styrene | 91.9 | 11.7 | 18.1 |
| 29 | BA, 10% AA | Styrene | 170 | 30.0 | 11.8% |
| 30 | MEA, 10% AA | Styrene | 85 | 14.0 | 12.8% |
| 31 | MEA, 15% AA | Styrene | 115 | 25.2 | 13.4% |
| 32 | MEA, 15% AA | Styrene | 100 | 19.0 | 14.1% |
| 33 | BA, 10% AA | Styrene | 84.3 | 26.6 | 7.9% |
| 34 | BA, 10% AA | Styrene | 80.1 | 22.6 | 7.7% |
| 35 | MEA, 15% AA | Styrene | 81.2 | 24.3 | 10.5% |
| 36 | MEA, 15% AA | Styrene | 75.6 | 22.6 | 13.0% |
| 37 | BA, 10% AA | Styrene | 77.2 | 21.8 | 7.7% |
| 38 | MEA, 10% IA | Styrene | 99.2 | 31.3 | 3.9% |
| 39 | MEA, 15% AA | Styrene | 79.7 | 16.3 | 14.6% |

TABLE 1-continued

Amphiphilic Block Copolymer Examples.

| Example# | Midblock type | Endblock type | $1^{st}$ block Mn (kg/mol) | $2^{nd}$ block Mn (kg/mol) | Acid in midblock |
|---|---|---|---|---|---|
| 40 | BA, 10% AA | Styrene | 38.3 | 8.0 | 7.6% |
| 41 | BA, 10% AA | Styrene | 39 | 19.2 | 7.7% |
| 42 | BA, 10% AA | Styrene | 68 | 13.3 | 7.9% |
| 43 | BA, 10% AA | Styrene | 70.5 | 30.9 | 7.8% |
| 44 | BA, 25% AA | Styrene | 41.1 | 7.8 | 19.0% |
| 45 | BA, 25% AA | Styrene | 39.7 | 20.8 | 18.4% |
| 46 | BA, 25% AA | Styrene | 73.7 | 13.7 | 18.6% |
| 47 | BA, 25% AA | Styrene | 76.5 | 31.1 | 18.7% |
| 48 | MEA, 15% AA | Styrene | 82.8 | 13.5 | 15.1% |
| 49 | MEA, 15% AA | Styrene | 83.4 | 14.7 | 14.1% |
| 50 | MEA, 15% AA | Styrene | 82.8 | NM | NM |
| 51 | MEA, 10% AA | Styrene | 78.9 | 8.5 | 9.1% |
| 52 | MEA, 10% AA | Styrene | 78.9 | 33.2 | 9.1% |
| 53 | MEA, 25% AA | Styrene | 82 | 8.2 | 23.7% |
| 54 | MEA, 25% AA | Styrene | 82 | 30.0 | 23.4% |
| 55 | BA, 10% AA | Styrene | 80 | 15.0 | 11.3 |
| 56 | MEA, 25% AA | Styrene | 80 | 19.5 | 24.7 |
| 57 | DMA | Styrene | 70 | 41.4 | 0.1% |
| 58 | BA, 6% AA | MMA | 35 | 22.0 | 6.9 |

The midblock type describes the monomers used in the synthesis of the $1^{st}$ or middle block. The endblock type describes the primary monomer used in the $2^{nd}$ block or endblock synthesis and as described in the synthesis examples below, the endblock may or may not contain some level of monomer carryover from the $1^{st}$ block synthesis as well. The monomer abbreviations are: MEA=methoxyethyl acrylate, AA=acrylic acid, t-BA=tert-butyl acrylate, LMA=lauryl methacrylate, BA=butyl acrylate, EA=ethyl acrylate, MAA=methacrylic acid, MA=methyl acrylate, IA=itaconic acid, DMA=N,N-dimethylacrylamide, and MMA=methyl methacrylate. The $1^{st}$ block Mn values were calculated based on starting [M]/[I] ratios and monomer conversion data as measured by GC analysis and $2^{nd}$ block Mn values were calculated using NMR analysis coupled with $1^{st}$ block Mn values. The abbreviation NM indicates not measured.

Synthesis Method A:

Synthesis method A is a method of preparing an ABA block copolymer in which the residual monomers remaining after the $1^{st}$ block synthesis are removed (stripped under vacuum) prior to the endblock synthesis. A detailed example of this synthesis method is described below.

Example 2

Described below is the preparation of example number 2 from Table 1. 8.78 g (3.47 mmol) of dialkoxyamine from example 1 was weighed into a 1 L jar with 427.61 g (3.29 moles) MEA and 22.57 g AA (0.31 moles). The mixture was bubbled with nitrogen for 10 minutes, then added to a 1 L, jacketed, stainless steel reactor fixed with bottom sampling valve, nitrogen inlet, vacuum outlet, and mechanical mixing. The reactor was sealed and brought to the reaction temperature of 116° C. The polymerization was held between 115-117° C. for 2.5 hours. At that point, as measured by gas chromatography (GC), 62% of MEA and 68% of AA was converted to polymer. The temperature was lowered to 80° C. and the pressure was gradually reduced to 1.0 mbar to remove residual monomer. Following this stripping step, 150.2 g of toluene was added to the polymer to result in a solution that was 52% polymer, 47.2% toluene, and 0.8% residual acrylic monomer. To make the final triblock copolymer, 32.54 g of the above solution was mixed with 16.23 g of styrene in a 100 mL glass, jacketed reactor with mechanical stirring and nitrogen blanket. The polymerization was carried out at 115° C. for 2.5 hours and the conversion of styrene was approximately 25 wt %. The mixture was collected in a Teflon sheet and residual monomers and solvent were removed in a vacuum oven over 2 hours at 120° C. under full vacuum. The resultant triblock copolymer contained 19.2 wt % polystyrene, 3.9 wt % polyacrylic acid and 76.9 wt % polybutylacrylate.

Examples 3-15

Each of these multiblock copolymer examples is summarized in Table 1. The preparation of each composition was carried out using a difunctional alkoxyamine, such as the one described in example 1, and the general synthesis protocol described in method A. For each example, the polymerization followed the protocol described in example 2 above. The first block was polymerized in either a solvent or neat between the temperatures of 110-120° C. dependant upon the targeted conversion and monomer types utilized. Typical conversions ranged from 60 to 80%, which normally took between 2-8 hours. In each case, after the targeted monomer conversion was reached, the excess monomer was removed under vacuum at a temperature below 80° C. The dried first block was then re-dissolved in solvent and mixed with the second block monomer. The second block was polymerized between 110-120° C. to approximately 50% conversion. The block copolymers were subsequently isolated by drying under vacuum.

Example 16

Described below is the preparation of example number 16 from Table 1. 11.70 g (4.63 mmol) of dialkoxyamine from example 1 was mixed with 480.22 g (3.75 moles) BA, 120.04 g (1.40 moles) methacrylic acid (MAA), and 100 mL of dioxane. The mixture was bubbled with nitrogen for 15 minutes and then added to 1 L reactor described in example 2. The polymerization was carried out between 105-115° C. for 5 hours, until 63% conversion of BA and 94% conversion of MAA were reached. The polymer solution was stripped in a vacuum oven for 2 hours at 60-80° C. to remove excess BA. 165 grams of this polymer was dissolved in 247 g of dioxane to make a 40% first block solution. To 372.9 g of the 40% solution was added 81.47 g of styrene and an additional 100 mL of dioxane. The polymerization was carried out in the above-mentioned 1 L reactor at 116° C. for 5 hours, until 44% conversion of styrene. The final polymer was stripped in a vacuum oven at 120° C. for 3 hours under full vacuum. The resultant triblock copolymer contained 23.1 wt % polymethacrylic acid, 18.1 wt % polystyrene and 58.8 wt % polybutylacrylate.

Examples 17-19

Examples 17-19 along with example 16 demonstrate the synthesis of ABA triblock copolymers, which use the difference in reactivity ratios between an acidic monomer and a non-acidic comonomer to preferentially react out the acid containing monomer during the first block synthesis. By preferentially reacting out the acid, there is little or no acid remaining for incorporation into the endblocks. Low acid levels in the polymer endblocks results in polymers having much improved gel strength as compared to polymers with higher endblock acid content. In the aforementioned examples, the primary non-acidic comonomer is acrylic. It is known that methacrylic monomers inherently react faster than acrylic monomers, thus methacrylic acid is chosen over acrylic acid to ensure the majority of the acid is consumed prior to proceeding to the $2^{nd}$ block synthesis.

Synthesis Method B:

Synthesis method B is an example of preparing an ABA block copolymer in which the residual monomers remaining after the $1^{st}$ block synthesis are left in the mixture for the endblock synthesis to make a profiled block copolymer. Detailed examples of this synthesis method are described below.

Example 20

Described below is the preparation of example number 20 from Table 1. 78.77 g (1.09 moles) AA, 440.18 g (3.38 moles) MEA, and 10.31 g (4.08 mmol) of difunctional alkoxyamine from example 1, and 160.4 g of n-butanol were weighed into a 1 L jar. The mixture was degassed with nitrogen for 15 minutes. The mixture was added to the 1 L reactor from example 2 and polymerized between 110-117° C. for 5.5 hours, until 93% conversion of AA and 89% conversion of MEA were reached. To 625.7 g of this mixture was added 147.5 g of toluene and 290.7 g of styrene. The mixture was added to a 2 L glass, jacketed reactor with nitrogen inlet, reflux condenser, thermocouple and mechanical mixer. The second block polymerization was carried out between 112-117° C. for 3 hours until 30% conversion of styrene. The final polymer was isolated by drying under vacuum at 130° C. for three hours.

The resultant triblock copolymer contained 10 wt % polyacrylic acid, 22 wt % polystyrene and 68 wt % polymethoxyethyl acrylate.

Examples 21-28

Each of these multiblock copolymer examples is summarized in Table 1. The preparation of each composition was carried out using a difunctional alkoxyamine, such as the one described in example 1, and the general synthesis protocol described in method B. For each example, the polymerization followed the protocol described in example 20 above. The first block was polymerized in a solvent between the temperatures of 110-120° C. dependant upon the targeted conversion and monomer types utilized. Typical conversions ranged from 80 to 95%, which typically took between 2-8 hours. In each case, after the targeted monomer conversion was reached, the $2^{nd}$ block monomer was added with optionally additional solvent. The second block was polymerized between 110-120° C. to approximately 50% conversion. The final block copolymer compositions were isolated by drying under vacuum.

Synthesis Method C:

Synthesis method C is an example of preparing an ABA block copolymer in which the residual monomers remaining after the $1^{st}$ block synthesis are eliminated by a further polymer reaction step, commonly referred to as chasing, as will be evident to those skilled in the art. This method results in block copolymer/homopolymer blends. For example, the first block is synthesized by polymerizing a monomer or monomer mix to a desired conversion (less than 100%). The reaction mixture is then cooled to a temperature where the nitroxide is stable at which time a secondary initiation source, such as an organic peroxide, is added to carry out the polymerization of the residual $1^{st}$ block monomers. After the chasing step is complete, the $2^{nd}$ block monomer(s) can be added and the temperature increased to allow for the activation of the nitroxide end groups, which subsequently leads to the formation of a block copolymer. A detailed example of this synthesis method is described below.

Example 29

Described below is the preparation of example number 29 from Table 1. 380.60 g (2.97 moles) of BA, 42.33 g (0.59 moles) AA, 95.85 g (1.04 moles) toluene, and 5.40 g (2.14 mmol) of difunctional initiator were weighed into a 1 L jar. The mixture was degassed with nitrogen for 10 minutes then added to the 1 L stainless steel reactor from example 2. The first block polymerization was carried out between 115-120° C. for 5 hours, until the conversion of BA reached 84%. The reaction product was diluted with an additional 170 g of toluene and isolated. 405 g of the mixture was then added to the 1 L stainless steel reactor from example 2 and heated to 60° C. Next, a solution of 3.15 g of Luperox610M50 in 90.85 g toluene was added to the vessel. The reaction temperature increased and the peak exotherm resulted in a 6 degree difference between reaction medium and the vessel jacket. This mixture was kept at 65-75° C. for 1 hour, to ensure the majority of the peroxide had decomposed. Next, 108.8 g of styrene was added as the second block monomer and the vessel temperature was increased to 115-120° C. to activate the nitroxide end-capped polymer chains. The second block reaction proceeded for 3 hours to 35% conversion of styrene. The polymer was then isolated by removing all volatiles under vacuum at 130° C. for 3 hours. The resultant triblock copolymer contained 10 wt % polyacrylic acid, 15 wt % polystyrene and 75 wt % polybutylacrylate.

Examples 30-56

Each of these multiblock copolymer examples is summarized in Table 1. The preparation of each composition was carried out using a difunctional alkoxyamine, such as the one described in example 1, and the general synthesis protocol described in method C. For each example, the polymerization followed the protocol described in example 29 above. The first block was polymerized in a solvent between the temperatures of 110-125° C. dependant upon the targeted conversion and monomer types utilized. Typical conversions ranged from 80 to 95%, which generally took between 2-8 hours. In each case, after the targeted monomer conversion was reached, the reaction is cooled to <60° C. and a solution of free radical initiator is added. A preferred temperature to carry out this reaction step is at the 10-minute half-life temperature of the free radical initiator, but in each case the reaction mixture was always kept below the nitroxide activation temperature (typically below 80° C.). This step is carried-out for a period of time sufficient to deplete the remaining monomer and initiator. After this step was complete, the second block monomer was added to the solution and the vessel temperature was increased to 110-120° C. to allow for reactivation of the nitroxide chain ends and allow for the subsequent $2^{nd}$ monomer polymerization to occur. The $2^{nd}$ block monomer typically proceeded to less than 50% conversion and the resultant block copolymer was isolated by removing volatiles under vacuum.

Example 57

Described below is the preparation of example number 57 from Table 1. This example was carried out using method C described above with a slightly lower first block conversion (60%) than the preceding examples. 360 g (3.60 moles) of DMA, 87.0 g (0.95 moles) toluene, and 8.22 g (3.25 mmol) of difunctional initiator from example 1 were weighed into a 1 L jar and degassed with nitrogen for 10 minutes and added to the 1 L stainless steel reactor described in example 2. The solution was then polymerized for 2.5 hours to 63% conversion. 381 g of additional toluene was added and the polymer intermediate was isolated. To make the final triblock copolymer, 71.4 g (20 g of polymer) of the above solution was mixed with 26 g of styrene in a 100 mL glass, jacketed reactor with mechanical stirring and nitrogen blanket. The second block synthesis was carried out for 4 hours, until conversion of styrene and DMA were 40% and 22%, respectively. This resulted in a polymer endblocks containing 19% polyDMA and 81% polystyrene. The polymer was then isolated by removing all volatiles under vacuum at 130° C. for 3 hours. The resultant triblock copolymer contained 68 wt % polyDMA and 32 wt % polystyrene.

Example 58

PMMA/AA-PBA/AA-PMMA/AA Described below is the preparation of example number 58 from Table 1. This example was carried out using method B described above. Weighed 31.409 g (0.44 moles) of AA, 550.054 g (4.22 moles) BA, 33.929 g (13.4 mmol) difunctional initiator solution into a 1 L jar and degassed the mixture with nitrogen for 15 minutes. The mixture was polymerized at 115-120° C. for 4 hours, until the conversion of BA reached 77%. The mixture was diluted with toluene, resulting in a solution containing 48% polyBA, 13% BA, 2% ethanol, and 37% toluene. To 463.4 g of this mixture, was added 96.8 g toluene, 95.5 g of MMA, and 17.0 g AA. The solution was degassed with nitrogen for 15 minutes, then polymerized at 105-110° C. for 1 hour, followed by 2 hours at 110-115° C., until the MMA conversion reached 87%. The resultant triblock copolymer triblock copolymer contained 70.1 wt % polyBA, 22.7 wt % polyMMA, and 7.2 wt % polyAA. The volatiles were removed under vacuum for 20 hours at 110° C.

Example 58 demonstrates the synthesis of an ABA triblock copolymer, which incorporates amphiphilic monomers in both the hydrophilic and the hydrophobic blocks. This material is an example of tailoring the ultimate gel strength, as the polymer will form a slightly weaker gel in water as compared to triblocks with little to no acid in the endblocks. The more hydrophilic monomer incorporated into the endblock, the weaker the corresponding gel. Furthermore, when acid is the hydrophilic monomer incorporated into the endblocks, such as in example 58 above, the non-covalent crosslinks can be broken by neutralization in the presence of water as will be evident to those skilled in the art.

Example 59

Several polymers from Table 1 were tested for water solubility. Samples 8, 55, and 58 from Table 1 were melt pressed and weighed (dry weight). The samples were then placed in water and allowed to soak at RT for >96 h's. Next the samples were removed from the water solution and weighed to determine the water absorption. Next the samples were dried under vacuum to a constant weight to ensure all the absorbed water was removed. The results are given in Table 2 below.

TABLE 2

| Sample # (From Table 1) | Dry polymer (grams) - before water exposure | Wet polymer (grams) - after soaking in water | Dry polymer (grams) - after vacuum drying | Water absorbed (wt %) | weight loss (wt %) |
|---|---|---|---|---|---|
| 8 | 0.275 | 0.310 | 0.271 | 12.7 | 1.5 |
| 55 | 0.237 | 0.277 | 0.236 | 17.0 | 0.6 |
| 58 | 0.253 | 0.340 | 0.251 | 34.3 | 1.1 |

As evinced from Table 2, the lack of polymer weight loss demonstrates the samples remain water insoluble and the hydrogel behavior is clearly revealed by the water absorption data.

Example 60

Example 60 demonstrates the melt processability and thermoplastic elastomer behavior of the herein described triblock copolymer compositions. Samples 8, 55, and 58 were all melt processed on a Carver hot press. The press was set to 140° C. and the polymers flowed with minimal pressure. Thin films were easily fabricated. These films were transparent, which is a good indication that the block copolymers were well defined and subsequently phase separated into a nanostructured morphology. These thin films were robust and extremely flexible behaving as thermoplastic elastomers. The films were easily stretched to several times their length and elastic behavior observed as the material regained the original shape after the deformation force was removed. Further demonstrating the melt processability of the polymers, samples 2, 3, 4, 8, 13, 16, 29, 55, 56, and 57 from Table 1 were pressed into a thin films, using an analogous method to the one described above.

Example 61

To demonstrate absorption/swelling, the thin film of sample 4 was placed in water with 2% trisodium phosphate as a buffer (pH approx 6-7). The polymer began to swell at this pH and the swelling increased upon further neutralization with sodium hydroxide to a pH of 9 . . . . After soaking for approximately 20 hours, the sample swelled from its original dimensions of 1 cm×2 cm×1 mm to 2 cm×4.2 cm×2 mm, growing 8 times larger volumetrically.

Additional water absorption test results are shown below in Table 3.

TABLE 3

| Example # | Ex # From table 1 | polymer wt. (g) | 10 wt % TSP wt. (g) | water wt. (g) | pH | Gel wt. (g) | wt % water absorption |
|---|---|---|---|---|---|---|---|
| 61a | 2 | 0.386 | 3.8263 | 7.7076 | 6.3 | 0.8068 | 109.0% |
| 61b | 3 | 0.3651 | 3.652 | 7.2086 | 6.4 | 0.6385 | 74.9% |
| 61c | 8 | 0.211 | 2.1848 | 5.497 | 6.2 | 0.7674 | 263.7% |
| 61d | 8 | 0.211 | 2.1848 | 5.497 | 10.7 | 0.9616 | 355.7% |
| 61e | 13 | 0.2969 | 2.971 | 6.0138 | 6.4 | 0.3114 | 4.9% |
| 61f | 16 | 0.1694 | 1.7161 | 3.7218 | 6.5 | 0.1783 | 5.3% |
| 61g | 29 | 0.27 | 2.6956 | 6.0679 | 6.4 | 0.2806 | 3.9% |
| 61h | 56 | 0.3636 | 3.6407 | 7.2202 | 5.7 | 1.7761 | 388.5% |
| 61i | 56 | 0.3636 | 3.6407 | 7.2202 | 6.1 | 2.0105 | 452.9% |
| 61j | 57 | 0.2566 | 2.5611 | 5.285 | 6.4 | 0.5928 | 131.0% |

Example 61A-61I

A small strip of polymer was weighed and placed into a 4 dram vial. Next, 10 times the polymer weight of a trisodium phosphate solution (10 wt % aqueous) was added. Finally, approximately 2 times the amount of water to completely cover the sample was added. The samples were soaked for at least 24 hours, after which time they were re-weighed. After soaking for at least 24 hours as described above, a small amount of sodium hydroxide was added to samples 61d and 61h to further increase the pH. The pH of the solution is listed in Table 3, and as evidenced from the comparison of examples 61c vs. 61d, 61h vs. 61i the water absorption can be increased by increasing the pH.

Example 62

In conjunction with sample 59, to demonstrate that the addition of a base is not needed to provoke water absorption in amphiphilic polymers containing acid functionality, thin films of several samples from Table 1 were placed directly in water and allowed to soak overnight. The samples and the corresponding absorption values measured follow; sample 2 had 9.7 wt % water absorption, sample 8 had 8.0 wt % water absorption, and sample 56 had 17.2 wt % water absorption. The non acid containing sample 57 had 122 wt % water absorption.

What is claimed is:

1. An amphiphilic multiblock copolymer consisting of:
   a) a hydrophilic middle block; and
   b) hydrophobic end blocks
   wherein said multiblock copolymer is water insoluble, water indispersible, and not soluble or dispersible in $C_{1-3}$ alcohols, and wherein at least one block is a profiled block,
   wherein said hydrophilic block comprises one or more monomeric units selected from acrylic acid, methacrylic acid, and the salts, esters, anhydrides and amides of acrylic acid and methacrylic acid; dicarboxylic acid anhydrides; carboxyethyl acrylate; and acrylamides.

2. The amphiphilic multiblock copolymer of claim 1 made by a controlled radical polymerization process.

3. The amphiphilic multiblock copolymer of claim 2 wherein said controlled radical polymerization process is a nitroxide-mediated polymerization process.

4. The amphiphilic multiblock copolymer of claim 1, wherein said copolymer can absorb from 1 to 10,000 weight percent of water or $C_{1-3}$ alcohols, based on the polymer weight.

5. The amphiphilic multiblock copolymer of claim 1 wherein said hydrophobic blocks each have a molecular weight of from 0.5 kg/mol to 80 kg/mol, and said hydrophilic block has a molecular weight of from 2 kg/mol to 160 kg/mol.

6. The amphiphilic multiblock copolymer of claim 5 wherein said hydrophobic blocks each have a molecular weight of from 3 kg/mol to 60 kg/mol, and said hydrophilic block has a molecular weight of from 15 kg/mol to 100 kg/mol.

7. The amphiphilic multiblock copolymer of claim 1, wherein said copolymer is an ABA triblock copolymer wherein A represents a hydrophobic block polymer and B represents a hydrophilic block polymer.

8. The amphiphilic multiblock copolymer of claim 1, wherein said hydrophilic middle block is a random copolymer formed from two or more different monomer units.

9. The amphiphilic multiblock copolymer of claim 1, wherein said hydrophobic endblocks comprise a random copolymer formed from two or more different monomer units.

10. The amphiphilic multiblock copolymer of claim 1 wherein said multiblock copolymer is in the form of a non-covalently crosslinked hydrogel.

11. The amphiphilic multiblock copolymer of claim 1, wherein said hydrophilic middle block is a random copolymer of a $C_{1-8}$ acrylate with acrylic acid, methacrylic acid or a mixture thereof.

12. The amphiphilic muliblock copolymer of claim 1, wherein said copolymer is a thermoplastic elastomer, wherein the hydrophobic end blocks have a Tg of from 0° C. to 300° C., and the hydrophilic middle block has a Tg of from −200° C. to 130° C., and wherein the hydrophobic end blocks have a Tg higher than that of the hydrophilic middle block.

13. The amphiphilic multiblock copolymer of claim 12, wherein the hydrophobic end blocks have a Tg of from 30° C. to 150° C., and the hydrophilic middle block has a Tg of from −80° C. to 50° C.

14. A polymer blend comprising the amphiphilic multiblock copolymer of claim 1 with one or more polymers selected from the group consisting of a hydrophobic homopolymer, a hydrophobic copolymer, a hydrophilic homopolymer, and/or a hydrophilic copolymer.

15. The polymer blend of claim 14, wherein one or more of the hydrophilic homopolymer, hydrophilic copolymer, hydrophobic homopolymer, or hydrophobic copolymer is formed of the same monomer units as one or more of the amphiphilic copolymer block segments.

16. The amphiphilic triblock copolymer of claim 1 comprising an article, a coating, or a film.

17. A method for tailoring the mechanical and/or physical properties of an insoluble triblock copolymer comprising, forming a triblock copolymer by means of a controlled radical polymerization process, and adjusting the compositions of each block to obtain the specified mechanical and/or physical properties, wherein said insoluble triblock copolymer is water insoluble, water indispersible, and not soluble or dispersible in $C_{1-3}$ alcohols.

18. The method of claim 17 wherein said mechanical and/or physical properties being tailored are water permeability and/or water absorption.

* * * * *